Jan. 8, 1963  S. THALER  3,072,857
AMPLITUDE RATIO DETECTOR CIRCUIT
Filed March 2, 1960  2 Sheets-Sheet 1

INVENTOR.
SAMUEL THALER,
By Walter J. Adam
ATTORNEY

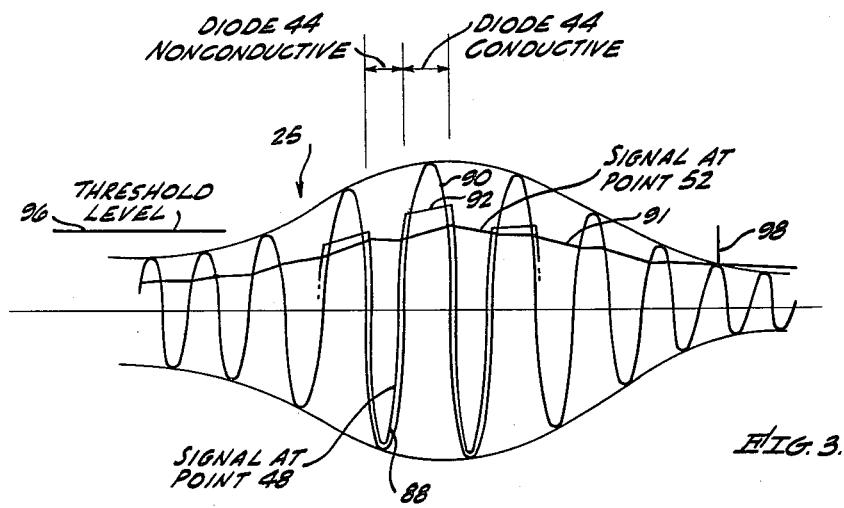
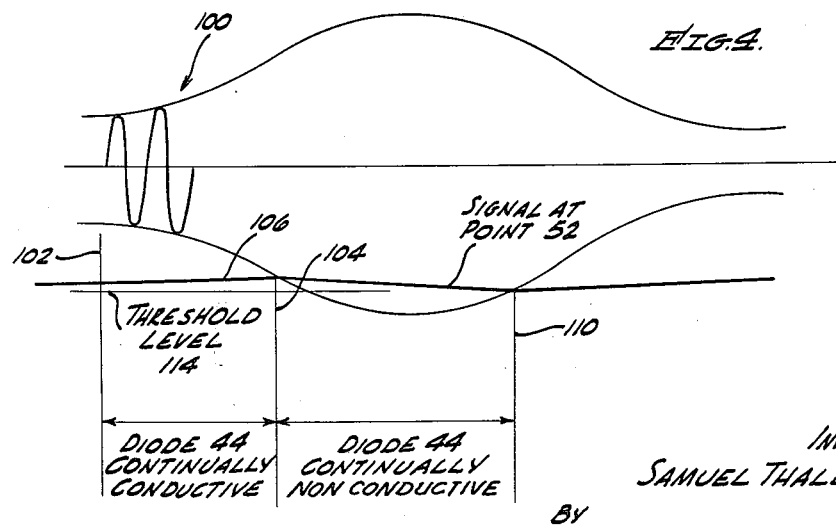

United States Patent Office 3,072,857
Patented Jan. 8, 1963

3,072,857
AMPLITUDE RATIO DETECTOR CIRCUIT

Samuel Thaler, Reseda, Calif., assignor to Hughes Aircraft Company, Culver City, Calif., a corporation of Delaware
Filed Mar. 2, 1960, Ser. No. 12,473
8 Claims. (Cl. 329—130)

This invention relates to detecting circuits and particularly to a detector circuit useful in Doppler radar that develops an output signal substantially independent of the absolute level of the input signal.

In pulse Doppler radar systems one or more range gates are generally utilized followed by a bank of Doppler filters for each range gate, with each Doppler filter followed by a detector and a post detection filter that leads to a threshold device. In order to reduce the number of Doppler filters to an economical number, each filter may be selected with a band width much wider than the spectral width of the echoes from radar targets. A system of this type utilizes a predetermined threshold level to determine the presence of a target signal when the detected signal developed from the input signal is greater than the threshold level. The amplitude of the detected and filtered signal has been found to be a practical criterion for distinguishing targets from noise plus clutter. However, with any set threshold level, both target signals and noise signals such as receiver noise, main lobe clutter or side lobe clutter may exceed the threshold level to indicate the presence of a target. Variations in gain in the circuits preceding the detector may cause the threshold level to be exceeded when a target signal is not present or cause a target to have such a small amplitude that it will not have the amplitude of the threshold level. The rate of indications of a target caused by noise for any threshold voltage level is called the false alarm rate of the system.

In order to select a threshold level that provides the greatest chance of a target indication actually being a target, it is required that the false alarm rate be substantially constant and less than some predetermined level. Some prior art methods are to use a limiter followed by a narrow band filter and a conventional detector circuit or to use a logarithmic receiver followed by a differentiation circuit. The conventional detector circuit does not function properly when the spectrum of the noise changes. The logarithmic receiver controls the amplitude of the noise but is complex and has a plurality of components. To keep the false alarm rate constant, it is necessary that the level of noise plus clutter signals be substantially constant. A detector circuit for use in Doppler radar that responds to noise and target signals to provide a controlled false alarm rate and high signal sensitivity would be very valuable to the art.

It is, therefore, an object of this invention to provide an improved and simplified detector circuit useful in pulse Doppler radar so as to provide reliable target signal determination with a minimum false alarm rate.

It is a further object of this invention to provide a simplified detector circuit that includes only passive type elements so that a detector may be utilized after each Doppler filter in a Doppler radar system while resulting in a minimum of weight and complexity to the system.

It is a still further object of this invention to provide an amplitude ratio detector circuit that produces output signals having amplitude fluctations proportional to the duration of the fluctuations of the input signals.

It is another object of this invention to provide a simplified circuit that functions either as an amplitude detector or as a frequency discriminator depending on the values of the circuit parameters utilized.

Briefly the amplitude ratio detector in accordance with this invention develops an output signal having amplitude fluctuations which depend on a ratio of a stored voltage indicative of the amplitude of the input signal over the recent past to the instantaneous amplitude fluctuations of the input signal so that the output signal is substantially independent of the absolute level of the input signal. The input signal may include both target signals and noise signals of varying amplitude caused, for example, by varying gain characteristics of circuits preceding the detector circuit. The detector includes a bi-directional switch having first and second diodes with one end of each diode coupled to a first signal point. The other end of the first diode is coupled to the input terminal and the other end of the second diode is coupled to a second signal point. A positive source provides a substantially constant current source to the first signal point and through the bi-directional switch, either to the input terminal or to the second signal point as determined by the potential relation between the input terminal and the second signal point. The second signal point is coupled to a filter device that includes a storage capacitor. In a first mode of operation the bi-directional switch conducts current to the storage capacitor during a part of each cycle of the input signal and during the remainder of the cycle the storage capacitor discharges a substantially constant current to a negative potential source coupled thereto. The filter device includes a band pass filter path to an output terminal. Because the operating time of the bi-directional switch depends on the ratio of the voltage across the storage capacitor, which represents the voltage of the envelope of the input signal during the recent past cycles to the voltage of the envelope of the input signal, the output signal is substantially independent of the average voltage level of noise in the input signal. The circuit provides a second mode of operation when capacitance is provided at the first signal point so that this signal point is unable to follow rapid positive going changes of the input signal. In the second mode of operation, the circuit is similar to an envelope detector except that the output signal is dependent on the ratio of the stored voltage to the instantaneous voltage of the input signal.

The novel features which are believed to be characteristic of the invention, both as to its organization and method of operation, together with further objects and advantages thereof, will be better understood from the following description considered in connection with the accompanying drawings, in which like characters refer to like parts, and in which:

FIG. 3 is a graph of amplitude versus time for explaining a first mode of operation of the detector circuit of FIG. 2; and FIG. 4 is a graph of ampitude versus time for explaining a second mode of operation of the detector circuit of FIG. 2.

Figure 1:
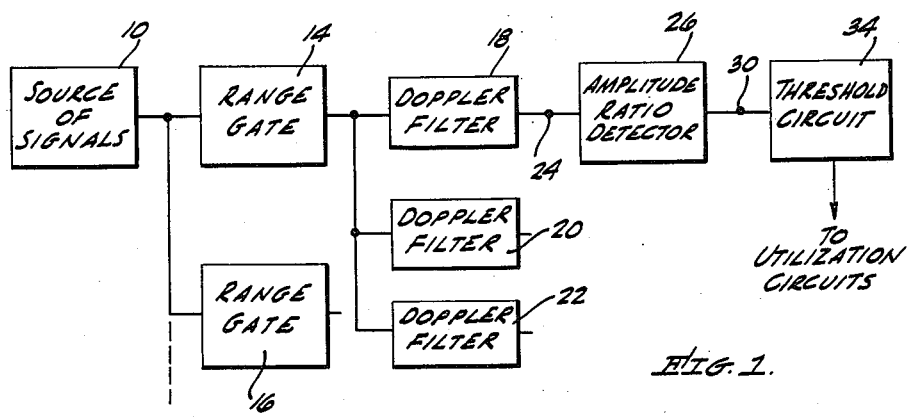
FIG. 1 is a block diagram of a pulse Doppler radar system to illustrate an example of utilization of the amplitude ratio detector system in accordance with this invention.

Referring first to FIG. 1 which is a block diagram of a conventional pulse Doppler radar system, the utilization of the amplitude ratio detector circuit in accordance with this invention will be explained. The radar system may include a source of IF (intermediate frequency) signals 10, which as is well known in the art may include an antenna system and mixing circuits for developing IF signals. The IF signals may be applied to a plurality of range gates, such as range gates 14 and 16. A bank of Doppler filters, such as filters 18, 20 and 22, follows each range gate, such as 14, for passing signals through a relatively narrow passband of selected frequencies. Each of the Doppler filters, such as the filter 18, applies the IF signal passed therethrough to a terminal 24 and to a detector circuit 26, which advantageously may be the amplitude ratio detector circuit in accordance with this invention. The output signal from the detector 26 is applied to a terminal 30 and to a threshold circuit 34 that has a predetermined voltage level for distinguishing target signals from noise signals. As is well known in the art, only output signals developed by the detector 26 that supersede the threshold level are applied through the threshold circuit 34 to indicate the presence of a target. Target signals from the threshold circuit 34 are applied to utilization circuits (not shown) which are well known in the art.

Figure 2:
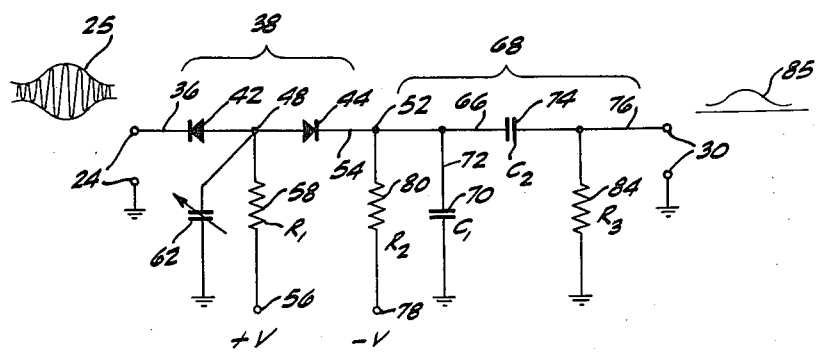
FIG. 2 is a schematic circuit diagram showing the details of the amplitude ratio detector system that may be utilized in the system of FIG. 1.

Referring now to FIG. 2 which is a schematic circuit diagram of the detector circuit in accordance with this invention, the arrangements of the elements therein will be explained. An input signal shown by a waveform 25, which may be an intermediate frequency signal including noise and target components, is applied from the terminal 24 through a lead 36 to a bi-directional switch 38. The bi-directional switch 38 includes a first diode 42 and a second diode 44 with their anodes coupled to a first signal point 48. The first diode 42 has its cathode coupled to the lead 36 to provide a current path from the input terminal 24, and the second diode 44 has its cathode coupled to provide a current path to a second signal point 52 through a lead 54. A current source is connected to the first signal point 48 from a positive terminal 56 having a potential +V through a resistor 58 having a value $R_1$. Current from the terminal 56 either flows through the first diode 42 to the input terminal 24 or through the second diode 44 to the second signal point 52. Also coupled to the first signal point 48 is one end of a control capacitor 62, shown as a variable capacitor, its other end being grounded. As will be explained subsequently, the value of the control capacitor 62, which may be only the stray capacitance in the circuit, determines the mode of operation of the detector circuit.

The second signal point 52 is coupled through a lead 66 to a filter and storage device 68 which includes a storage capacitor 70 having one end coupled through a lead 72 to the lead 66 and the other end grounded. The filter and storage device 68 also includes a coupling capacitor 74 having one end coupled to the lead 66 and the other end coupled to an output lead 76 which in turn is coupled to the output terminal 30. The capacitors 70 and 74 have values indicated respectively by $C_1$ and $C_2$. To provide a discharge path for the storage capacitor 70, a negative terminal 78 having a voltage indicated by $-V$ is coupled through a resistor 80 having a value indicated by $R_2$, to the second signal point 52. Also, to provide the filter operation to the filtering and storage device 68 the output lead 76 is coupled to ground through a resistor 84 having a value $R_3$.

Referring now to FIG. 1 as well as to FIG. 2, the general operation of the amplitude ratio detector will be further explained. In the first mode of operation the capacitor 62 may be only the stray capacitance present in the circuit, which circuit is designed so that the capacitance provides a sufficiently short time constant to allow the first signal point 48 to follow the voltage changes of the intermediate frequency signal applied to the input terminal 24 when the first diode 42 is conductive. When the input signal of the waveform 25 is negative relative to the potential at the second signal point 52, the first diode 42 is biased into conduction by the +V potential at the terminal 56 and current flows from the terminal 56 through the first diode 42 to the input terminal 24. At the same time, the negative potential at the input terminal 24 is applied through the first diode 42 to bias the second diode 44 out of conduction. When the input signal of the waveform 25 rises in potential to a value relative to the voltage at the second signal point 52 so as to bias the first diode 42 out of conduction, the potential at the terminal 56 is applied to bias the second diode 44 into conduction. Thus, current flows from the terminal 56 to the first signal point 48 and through the diode 44 to the second signal point 52, and the voltage at the first signal point 48 follows the voltage at the second signal point 52. The first diode 42 is provided to isolate the current source of the terminal 56 from the input terminal 24 when supplying current to the second signal point 52.

The voltage at the second signal point 52 is determined by the stored charge across the storage capacitor 70. During the time that the second diode 44 is biased into conduction, current from the terminal 56 flows to charge the storage capacitor 70 and to increase the potential thereacross.

As this current signal passes to the storage capacitor 70, the coupling capacitor 74 is also charged at a rate determined by the relative size of the capacitors 70 and 74 so that a signal as shown by a waveform 85 is applied to the output terminal 30. Principally, this charge is stored in the storage capacitor 70 to provide a voltage comparison level for subsequent times when the second diode 44 has been rendered nonconductive and again biased into conduction. When the input signal falls to a voltage level that is less than the potential at the second signal point 52, the first diode 42 is biased into conduction and the second diode 44 is again biased out of conduction. The current from the terminal 56 again flows through the first diode 42 to the input terminal 24. With the second diode 44 rendered nonconductive, the storage capacitor 70 discharges through the resistor 80 at a rate determined by the value of resistance $R_2$ of the resistor 80. Coincident with this discharge of the storage capacitor 70, the coupling capacitor 74 also discharges so that a voltage signal of decreasing level is applied to the output terminal 30. The time of discharging of the storage capacitor 70 is dependent on the amplitude of the envelope of the input signal of the waveform 25 applied to the input terminal 24. Also, the time or fraction of a cycle of charging of the storage capacitor 70 is dependent upon the amplitude of the envelope of the input signal. As a result of the operation of the bi-directional switch 38, the voltage level at the second signal point 52 is dependent upon the past amplitude history of the input signals. Because the potential across capacitor 70 or at the second signal point 52 is principally the voltage level applied to the output terminal 30 and because the time of charging and discharging of the storage capacitor 70 is determined by a comparison of the voltage at the second signal point 52 with the input signal at the input terminal 24, the output signal follows the input signal at a controlled amplitude level. The potentials at the current sources of the terminals 56 and 78 are selected relative to the potential at the second signal point 52 so that substantially constant current sources are provided.

The output signal at the terminal 30 is thus a function of the ratio of the stored voltage at the second signal point 52 over the amplitude of the envelope of the input signal of the waveform 25 applied to the input terminal 24. Although the voltage of the alternations of the input signal is the voltage applied to the diodes 42 and 44, the output signal is a function of the amplitude of the envelope of the input signal because the amplitude of the envelope is related to the time of charging and discharging of the storage capacitor 70. Thus, in the first mode of operation the circuit of FIG. 2 provides an output signal that is a function of the ratio of an average voltage of the input signal to the envelope amplitude of the input signal. Therefore, the detected output signal as shown by the waveform 85 in response to an input signal including noise signals and target signals is relatively independent of changes of gain of the input signal. The signal at the signal point 52 applied to the output terminal 30 through the capacitor 74 is smoothed as controlled by the time constant of the filter device 68. As a result of the operaton of the detector circuit, a threshold level may be selected in the threshold circuit 34 so that changes of gain in the circuits preceding the input signal or of variations in the band width of the Doppler filters such as 18 (FIG. 1) will not change the reliability of indication of target signals.

In a second mode of operation, the control capacitor 62 is selected so that the capacitance value at the first signal point 48 is sufficiently large enough to develop a long enough time constant so that the signal point 48 is unable to follow rapid positive going changes of the input signal applied to the input terminal 24. Under these conditions, the first diode 42 and the control capacitor 62 act like a peak detector and the first signal point 48 follows the negative edge of the input signal or the voltage of the point 52 which ever is more negative. When the envelope of the input signal of the waveform 25 is greater in amplitude than a negative stored voltage across the storage capacitor 70, the second diode 44 is biased into a nonconductive state. The second diode 44 is biased into conduction as a result of the level of the input envelope being less in amplitude than the magnitude of the negative voltage across the storage capacitor 70, and current flows from the terminal 56 through the second diode 44 to the storage capacitor 70. When the second diode 44 is nonconductive, current flows from the storage capacitor 44 through the resistor 80 to the terminal 78. Thus, the relative time that the capacitor 70 is charging or discharging determines the stored potential that is compared with the input signal to render the second diode 44 conductive or nonconductive. Therefore, in this second mode of operation as well as in the first mode of operation, the current components applied to the storage capacitor 70 and filtered to form the output signal depend on the ratio of the stored voltage of the storage capacitor 70 to the amplitude of the envelope of the input signal.

Referring now to FIG. 2 and to FIG. 3, which shows a waveform of the input signal, the first mode of operation of the amplitude ratio detector 26 will be explained in further detail. The input signal of the waveform 25 has a frequency such that with a selected value of the control capacitor 62, the first signal point 48 follows the alternations of the input signal. During a negative alternation 88 the first diode 42 is conductive and current flows from the terminal 56 to the input terminal 24. At the same time, the second diode 44 is nonconductive and the storage capacitor 70 as well as the coupling capacitor 74 discharge through the resistor 80 to the negative terminal 78. During the time of a positive alternation 90, the first diode 42 is nonconductive and the second diode 44 conducts current from the positive terminal 56 to the storage capacitor 70 as well as to the coupling capacitor 74. The potential at the second signal point 52 as shown by a signal 91 determines, during each positive alternation, the amplitude level such as the level 92 at the signal point 48 to control conduction of the diode 44. As the amplitude of each alternation such as the alternation 90 and the amplitude of the envelope increases from the preceding alternation, the second diode 44 conducts a greater fraction of the cycle to charge the capacitor 70 for a longer period of time than during the preceding alternation. Thus, as the amplitude of the envelope of the input signal increases, the reference potential across the storage capacitor 70 increases so that the input signal rises to a high voltage level before the diode 44 is biased into conduction. In a similar manner, when the input signal and the envelope is decreasing in amplitude the potential at the second signal point 52 decreases with each cycle and the diode 44 is biased into conduction a lesser fraction of the cycle and the capacitor 70 has a greater fraction of the time to discharge. Thus, the reference potential at the second signal point 52 is decreased.

During conduction of the second diode 44 such as during the positive alternation 90, the slope of the signal 91 increases at a constant rate because the terminal 56 is effectively a constant current source, relatively independent of the changes of level at the point 52. During a period when the diode 44 is nonconductive, the slope of the signal 91 decreases at a constant rate because the terminal 78 is effectively a constant current source, relatively independent of the varying potential across the capacitor 70. The stored potential at the point 52 is compared with the amplitude of the input signal so that the signal 91 is relatively independent of amplitude variations of the input signal. Thus, a threshold level 96 may be selected so that target signals consistently develop a signal 91 that exceeds the threshold level in amplitude regardless of variations of gains of the input signal. The signal 91 is then applied through the coupling capacitor 74 to appear at the output terminal 30 as shown by a waveform 85 (FIG. 2) with a similar shape to the signal 91 but smoothed because of the filtering action of the filter device 68. The waveform at the output terminal 30 may in some designs be appreciably different than the waveform at the signal point 52 because of the time constant of the circuit 68. This time constant associated with the coupling capacitor 74 and the resistor 84 may be chosen so that slow changes in amplitude level of the input signal at the terminal 24 are not present in the output signal.

When the envelope of the input signal of the waveform 25 falls below a minimum value at a time 98 (see FIG. 3), the diode 44 is continually maintained in a nonconductive state. During this condition after the time 98, which may be for a relatively short period, the signal 92 continues to slowly fall to a lower level until the input signal again rises in amplitude.

To further explain the operation of the circuit, assuming that the input signal of the waveform 25 is a narrow band signal, the current $i$ averaged over one cycle of the input signal flowing from the first signal point 52 to the capacitors 70 and 74 is:

$$i = -\frac{V}{R_2} + \left[ +\frac{V}{\pi R_1} \right] \text{arc cos} \left(\frac{v}{R}\right) \text{ when } \left(\frac{v}{a}\right) < 1$$

$$i = -\frac{V}{R_2} \text{ when } v/a > 1$$

where $-V$ and $+V$ are the potentials at the respective terminals 78 and 56.

$R_1$ and $R_2$ are the values of the respective resistors 58 and 80.

$v$ = the voltage across the storage capacitor 70.

$a$ = the amplitude of the envelope of the input signal.

These equations show that when the voltage $v$ of the signal 91 across the storage capacitor 70 is less than the amplitude "$a$" of the input signal, the diode 44 is rendered nonconductive during each positive alternation of the input signal, as discussed above. Also when the stored voltage $v$ of the signal 91 is greater than the amplitude of the input signal, the current signal is the discharge current into the negative terminal 78 because the diode 44 is continually maintained in a nonconductive state. During operation when the diode 44 is alternately biased into conduction, the part of each cycle when the diode 44 is biased into conduction and the storage capacitor 70 is being charged is equal to the ratio of the angle whose cosine is $$\frac{(v)}{a}$$

to $\pi$ radians. The voltage $v$ depends on the magnitude of the input signal in the recent past. The effective averaging time for $v$ to stabilize at some new level in response to a change in amplitude of the input signal depends on the size of the capacitors 70 and 74, the magnitudes of the currents $$\frac{V}{R_2}$$

and $$\frac{-V}{R_2}$$

and the magnitude of the amplitude change of the input signal. As previously discussed, the values of +V and −V are selected relative to the voltage $v$ so that the current $i$ is relatively independent of the value of $v$ and is substantially constant. Because of this averaging operation, the current signals applied through the filter device 68 to the output terminal 30 is a function of the value of the envelope of the input signal to the average voltage $v$ across the storage capacitor 70 and is relatively independent of gain changes applied to both noise and target components of the input signal.

Referring now to FIG. 2 and to FIG. 4, which is a waveform showing operation of the circuit in the second mode of operation, the operation of the circuit will be further explained. In the second mode of operation, the control capacitor 62 has a sufficiently large value so that the first signal point 48 is unable to follow rapid positive alternations of the input signal of a waveform 100. Operation in this second mode may be required in a system when the input signal has such a high frequency that the minimum stray capacitance, which may form the capacitor 62, is so large that the first mode of operation cannot be used. To explain the operation in the second mode, only the envelope of the input signal is shown in a waveform 100. During a period between a time 102 and a time 104 when the amplitude of the envelope has a greater positive value than the voltage at the second signal point 52 of a signal 106, the diode 44 conducts continually, charging the capacitor 70 to increase the voltage thereacross at a rate determined by the value $R_1$ of the resistor 58 and the potential +V at the terminal 56. Between times 104 and 110 when the envelope of the input signal has less positive amplitude than the signal 106 at the second signal point 52, the diode 44 is continually biased out of conduction and the capacitor 70 is discharged at a rate determined by the value $R_2$ of the resistor 80 and the −V potential at the negative terminal 78. During a long period high amplitude signal which may be a target signal between times 104 and 110, the signal 106 falls to a potential level below a selected threshold level 114.

Thus in the second mode of operation, the diode 44 is not alternately biased in and out of conduction during each cycle. The signal 106 may or may not be similar to the output signal at the terminal 70 after filtering depending on a time constant selected for the filter circuit 68.

The current $i$ at the second signal point 52 for the second mode of operation may be expressed as follows:

$$i = \frac{-V}{R_2} \text{ when } \frac{-v}{a} > 1$$

$$i = \frac{V}{R_1} - \frac{V}{R_2} \text{ when } \frac{-v}{a} < 1$$

In the above equations, it is assumed that the value $C_1$ of the capacitor 70 is much larger in value than the capacitor 62 so that substantially all of the current flows into the capacitor 70 when the diode 44 is conducting. Also in the above equations when $$\frac{-v}{a} > 1$$

the diode 44 is nonconducting and when $$\frac{-v}{a} < 1$$

the diode 44 is biased into conduction. The current $i$ flows not only into the storage capacitor 70 but also into the storage capacitor 74 so that the output voltage signal is applied through the filter device 68 to the terminal 30. Because the ratio $v/a$ determines when the diode 44 is conducting, the current $i$ and the output signal are determined by this ratio and not by the absolute amplitude of the input signal or of the voltage at the signal point 52. Thus, an output signal which may be similar to the signal 106, except that it has a different D.C. level, is relatively independent of gain changes of the input signal.

The circuit in accordance with this invention may also function as a frequency discriminator by eliminating the capacitor 74 and the resistor 84 so as to eliminate filtering of the output signal and blocking of the D.C. signal. As operation of the circuit switches from the first mode to the second mode, the output voltage across the storage capacitor 70 changes from a positive voltage to a negative voltage. Because the mode of operation depends on whether the voltage at the first signal point 48 can follow the voltage of the input signal or can only follow the negative envelope of the input signal, the circuit operation changes from the first mode to the second mode and changes the output voltage by increasing the frequency of the input signal. The circuit operates in a similar but opposite manner when decreasing the frequency so as to change operation from the second mode to the first mode.

Thus, there has been described an amplitude ratio detector that develops an output signal that is relatively independent of gain variations affecting the input signal. By minimizing the effect of gain changes on the amplitude of the detected noise signals, clutter signals and target signals, a threshold level may be selected in a Doppler radar system that provides a controlled false alarm rate. Because the circuit has two modes of operation depending upon the frequency of the input signal, the circuit in accordance with this invention may also be utilized as a simplified frequency discriminator.

What is claimed is:

1. A detector circuit for developing an output signal comprising a source of input signals of varying amplitude, a bi-directional switch having one end coupled to said source, a storage capacitor coupled to the other end of said bi-directional switch to maintain a variable stored potential, a first constant current source coupled to said bi-directional switch, a second constant current source coupled to said storage capacitor, filter means coupled to said storage capacitor whereby said storage capacitor charges from said first current source and discharges to said second current source as determined by a ratio of the amplitude of said stored potential and the instantaneous amplitude of said input signals, said stored potential being applied to said filter means to develop the output signal.

2. An amplitude ratio detector circuit for developing an output signal at an output terminal comprising a source of input signals subject to amplification by a varying gain value, a first and a second signal point, a first potential source coupled to said first signal point, a first diode coupled between said first signal point and said input terminal to provide a current path from said first potential source to said input terminal when said first diode is conductive, a second diode coupled between said first and second signal points to provide a current path from said first potential source to said second signal point when said second diode is conductive and said first diode is nonconductive, a second potential source coupled to said second signal point to provide a current path from said second signal point when said second diode is nonconductive, and capacitive storage means coupled to said output terminal and to said second signal point for receiving the current therefrom and for maintaining a stored potential to control conduction of said diodes relative to the potential of said input signals, said stored potential being applied to said output terminal to form said output signal.

3. A detector circuit for developing an output signal in response to amplified input signals including noise components and target components, the amplification of said input signal varying with time, said output signal being indicative of the presence of target components comprising a source of the input signals, a first and a second signal point, a first diode coupled between said source of input signals and said first signal point, a second diode coupled between said first and second signal points, a first constant current source coupled to said first signal point, a second constant current source coupled to said second signal point, an output terminal, and storage means coupled between said second signal point and said output terminal to apply a variable stored potential to said second signal point, said first and second diodes responding to the potential at said second signal point relative to the instantaneous potential of said input signal so that the variation of said stored potential representing noise and target components is relatively independent of the variation of the amplification of said input signals.

4. A radar detecting system for responding to an intermediate frequency signal from a signal source that varies the gain controlling the amplitude of the intermediate frequency signal with time, said intermediate frequency signal including noise components of varying amplitude and target signal components, said target signal components having a large amplitude for a relatively long period compared to said noise components comprising a first and a second signal point, a first diode coupled between said first signal point and the signal source, a second diode coupled between said first and second signal points, a positive potential source coupled to said first signal point, a negative potential source coupled to said second signal point, a storage capacitor coupled to said second signal point, filter means coupled to said second signal point, and a threshold circuit coupled to said filter means to establish a threshold level representative of the presence of a target signal component in said input signal, the potential at said second signal point being compared with the instantaneous amplitude of said input signal to control conduction of said first and second diodes so that said noise target signals have substantially constant levels relative to said threshold level and the rate of change of potential at said second signal point indicates the presence of target signals substantially independent of the variation of gain controlling the amplitude of said intermediate frequency signal.

5. A detector circuit for comparing the instantaneous amplitude of the envelope of an input signal subject to a varying gain factor with a stored potential to develop an output signal that is relatively independent of the variations of the gain factor comprising an input terminal and an output terminal, a first and a second signal point, a first diode coupled between said input terminal and said first signal point, a second diode coupled between said first and second signal points, a positive potential source, a first resistor coupled between said positive potential source and said first signal point, a negative potential source, a second resistor coupled between said negative potential source and said second signal point, an intermediate potential source, a storage capacitor coupled between said intermediate potential source and said second signal point, a coupling capacitor coupled between said second signal point and said output terminal, and a third resistor coupled between said output terminal and said intermediate potential source, said first and second diodes responding to the ratio of the stored potential across said storage capacitor to the instantaneous amplitude of the envelope of the input signal to maintain the rate of change of said stored potential across said storage capacitor relatively independent of the variations of the gain factor, said stored potential being applied through said coupling capacitor to said output terminal to develop the output signal.

6. A detector circuit controllable to detect the positive and negative amplitude changes of an input signal having alternations varying in amplitude with time and subject to a varying gain parameter comprising an input terminal for receiving said input signal, a first and a second signal point, a first diode having an anode to cathode path coupled between said first signal point and said input terminal, a second diode having an anode to cathode path coupled between said first and second signal points, a variable control capacitor coupled to said first signal point to develop a first time constant thereat so that said second signal point follows the alternations of the input signal and to develop a second time constant so that said first signal point follows the negative envelope of the input signal, a first constant current source coupled to said first signal point, a second constant current source coupled to said second signal point, and a storage capacitor coupled to said second signal point for maintaining a potential thereat as determined by the time of conduction of said second diode so that with said first time constant the potential at said second signal point substantially follows the positive amplitude changes of said input signal and with said second time constant the potential at said second signal point substantially follows the negative amplitude changes of said input signal, the rate of amplitude of both the positive and negative signals at said second signal point being substantially independent of the varying gain parameter changing the amplitude of said input signal.

7. A circuit for detecting from an input signal a target signal in the presence of noise signals, the input signal subject to varying amplification, said circuit developing an output signal comprising a source of input signals in which the target signals have a relatively long time duration compared to the noise signals, a first diode having an anode and cathode with the cathode coupled to said source of input signals, a second diode having an anode and a cathode with the anode coupled to the anode of said first diode, a source of positive potential, a first resistor coupled between said source of positive potential and the anodes of said first and second diodes, a source of negative potential, a second resistor coupled between said source of negative potential and the cathode of said second diode, and filter means including a storage capacitor coupled to the cathode of said second diode for providing a reference potential, whereby said first diode is biased out of conduction and said second diode is biased into conduction to supply current from said source of positive potential to said storage capacitor when the instantaneous amplitude of the input signal exceeds said reference potential and said first diode is biased into conduction and said second diode is biased out of conduction to discharge said storage capacitor to said source of negative potential when the instantaneous amplitude of said input signal is less than said reference potential, said reference potential maintaining a substantially constant amplitude during the short period amplitude changes of said noise signals and changing in amplitude during the long period amplitude changes of said target signals, said reference potential being applied to said filter means to develop the output signal.

8. An amplitude ratio detector circuit including a source of oscillating input signals, the source including amplifying means, the input signals including amplified target signals in the presence of amplified noise signals, the gain of said amplifying means varying with time comprising a first and a second signal point, a first potential source coupled to said first signal point, a bi-directional switch coupled to said first signal point, to said source of input signals and to said second signal point, said bi-directional switch having a first current path including a first diode coupled from said first potential source to said source of input signals and having a second current path including a second diode coupled from said first potential source to said second signal point, a storage capacitor coupled to said second signal point for developing a variable stored potential, and a second potential source coupled to said second signal point to provide a third current path from said storage capacitor to said second potential source, said first diode being biased into conduction and said second diode being biased out of conduction during a portion of each cyle of said input signal when the amplitude of said stored potential exceeds the instantaneous amplitude of said input signal so that current flows in said first current path and in said third current path to discharge said storage capacitor, said first diode being biased out of conduction and said second diode being biased into conduction during a portion of each cycle of said input signal when the amplitude of said stored potential is less than the instantaneous amplitude of said input signal so that current flows in said first current path to charge said storage capacitor, the rate of change of said stored potential being relatively idependent of variations of the gain of the amplifying means.

References Cited in the file of this patent
UNITED STATES PATENTS

| | | |
|---|---|---|
| 2,757,297 | Evans et al. | July 31, 1956 |
| 2,877,421 | Emanuelsson | Mar. 10, 1959 |